United States Patent [19]

Ueno et al.

[11] Patent Number: 4,983,647

[45] Date of Patent: Jan. 8, 1991

[54] REINFORCED POLYPROPYLENE COMPOSITION

[75] Inventors: Kouhei Ueno; Tomohiko Akagawa; Yoshifumi Nakano, all of Sakai, Japan

[73] Assignee: Ube Industries, Ltd., Japan

[21] Appl. No.: 433,273

[22] Filed: Nov. 8, 1989

[30] Foreign Application Priority Data

Nov. 8, 1988 [JP] Japan ............................... 63-280328

[51] Int. Cl.$^5$ ..................... C08K 13/04; C08K 3/34; C08L 23/26
[52] U.S. Cl. ................. 523/220; 524/449; 524/504
[58] Field of Search ............. 524/449, 504; 523/220

[56] References Cited

U.S. PATENT DOCUMENTS

| | | | |
|---|---|---|---|
| 4,603,153 | 7/1986 | Sobajima | 524/449 |
| 4,694,031 | 9/1987 | Morita | 524/504 |
| 4,707,505 | 11/1987 | Matsuno | 524/504 |

FOREIGN PATENT DOCUMENTS

| | | |
|---|---|---|
| 52-36141 | 3/1977 | Japan . |
| 54-130647 | 10/1979 | Japan . |
| 55-16049 | 2/1980 | Japan . |
| 55-21438 | 2/1980 | Japan . |
| 55-45715 | 3/1980 | Japan . |
| 58-206659 | 12/1983 | Japan . |
| 59-226041 | 12/1984 | Japan . |
| 60-33432 | 2/1985 | Japan . |
| 61-98758 | 5/1986 | Japan . |

*Primary Examiner*—C. Warren Ivy
*Attorney, Agent, or Firm*—Charles P. Boukus, Jr.

[57] ABSTRACT

The present invention relates to a reinforced polypropylene composition comprising a polypropylene component (a modified polypropylene or a mixture of said modified polypropylene and an unmodified polypropylene), an ethylene-propylene copolymer, a glass fiber and mica having an average particle diameter of 40–160 μm and an average aspect ratio of 30–85. This composition can provide molded articles of very low warpage and is useful for the production of molded articles, particularly core materials of instrument panels for automobiles requiring high rigidity, high heat resistance and deformation resistance.

8 Claims, No Drawings

REINFORCED POLYPROPYLENE COMPOSITION

BACKGROUND OF THE INVENTION AND RELATED ART STATEMENT

The present invention relates to a reinforced polypropylene composition and more particularly to a reinforced polypropylene composition comprising inorganic fillers, which is suitable for the production of molded articles having high rigidity, high heat resistance and excellent resistance to warpage deformation.

It has hitherto been conducted to incorporate into a polypropylene various fillers such as fibrous fillers, e.g. glass fiber, carbon fiber, whiskers and metal fibers, plate-like fillers, e.g. mica, talc, kaolinite and glass flakes, and granular fillers, e.g. calcium carbonate, diatomaceous earth, alumina and glass beads, to obtain a polypropylene molded article with improved mechanical strength, rigidity, heat deformation resistance, etc. Such polypropylene molded articles are already in wide use in various applications.

Of the above fillers of various forms, the fibrous fillers, as compared with the fillers of other forms, have a very large reinforcing effect. Polypropylene compositions reinforced particularly with a glass fiber are a material which is suitable for producing a molded article of high rigidity and high heat resistance, and are in wide use in various fields. However, when a glass fiber-reinforced polypropylene composition is used to produce a large-sized molded article, the molded article is satisfactory in rigidity and heat resistance but gives large warpage deformation. This warpage poses a major problem when a glass fiber-reinforced polypropylene composition is used as a material for production of a large-sized molded article.

Meanwhile, when a plate-like filler or a granular filler is used, the resulting reinforced polypropylene composition gives reduced warpage deformation but shows a significantly lower effects in tensile strength, flexural strength and Izod impact strength than a polypropylene composition reinforced with a fibrous filler. Since a polypropylene composition reinforced with a plate-like filler such as mica or talc provides a molded article of good rigidity, there were made attempts to use a fibrous filler and a plate-like filler in combination [see, for example, Japanese Patent Application Kokai (Laid-Open) Nos. 52-36141, 54-130647, 55-16049, 55-21438, 55-45715, 58-206659, 59-226041, 60-23432, 61-98758, etc.]. However, even those reinforced polypropylene compositions disclosed in the above patent documents are unable to provide a molded article which is fully satisfactory in warpage and twist.

SUMMARY OF THE INVENTION

The object of the present invention is to solve the above mentioned problems of conventional glass fiber-reinforced polypropylene compositions and to provide a glass fiber-reinforced polypropylene composition which is suitable for production of a molded article with low warpage deformation.

According to the present invention, there is provided a glass fiber-reinforced polypropylene composition which can provide a molded article of far lower warpage deformation than before, by incorporating into the composition a particular amount of mica having a particular shape and dimension. That is, according to the present invention, there is provided a reinforced polypropylene composition comprising:

(a) 45-75% by weight of a polypropylene component which is a modified polypropylene modified with a modifier of an unsaturated acid or an organosilane compound, or a mixture of said modified polypropylene and an unmodified polypropylene, (b) 3-20% by weight of an ethylene-propylene copolymer, (c) 2-12% by weight of a glass fiber, and (d) 15-35% by weight of mica having an average particle diameter of 40-160 $\mu$m and an average aspect ratio of 30-85. According to the present invention, there is also provided a reinforced polypropylene composition according to the above, wherein the mica as the component (d) consists of mica (A) having an average particle diameter of 40-90 $\mu$m and an aspect ratio of 30-65 and mica (B) having an average particle diameter of 90-160 $\mu$m and an aspect ratio of 40-85, the weight ratio of (B)/(A) being 0.25-4.

The reinforced polypropylene composition of the present invention, when made into a molded article, has sufficient tensile strength, flexural strength, hardness, falling ball impact strength, etc. in practical application, is superior in other properties, and has balanced properties. When the composition is made into a large-sized molded article, in particular, the molded article gives significantly improved warpage which will cause substantially no problem in practical application, as compared with the molded articles made from conventional glass fiber-reinforced polypropylene compositions.

Thus, the reinforced polypropylene composition of the present invention has achieved the task of reducing the warpage of the molded articles made from reinforced polypropylene compositions without sacrifying their strengths and heat resistances, which tasks could not be achieved by conventional glass fiber-reinforced polypropylene compositions. The reinforced polypropylene composition of the present invention is useful particularly for the production of large-sized molded articles of low deformation, such as core materials of instrument panels for automobiles.

DETAILED DESCRIPTION OF THE INVENTION

In the present invention, the polypropylene used in the component (a), i.e. the polypropylene used for preparation of a modified polypropylene or as an unmodified polypropylene is a crystalline ethylene-propylene block copolymer having an ethylene content of 2-30% by weight, preferably 3-15% by weight. When the ethylene content is more than 30% by weight, the resulting composition has insufficient rigidity. When the ethylene content is less than 2% by weight, the composition has insufficient impact resistance.

The modified polypropylene modified with an organosilane compound or an unsaturated acid is a modified polypropylene obtained by melt kneading a polypropylene and an organosilane compound or an unsaturated acid in the presence of an organic peroxide.

The component (a) may be a mixture of the above modified polypropylene and an unmodified polypropylene. In this case, the amount of the modified polypropylene is preferably at least 20% by weight based on the composition. When the amount is less than 20% by weight, the resulting composition is insufficient in rigidity and impact strength.

The organosilane compound used for the preparation of the modified polypropylene is an organosilane compound having an ethylenically unsaturated bond such as vinyl group, allyl group, methacryloxy group or the like, and includes, for example, vinyltrimethoxysilane, vinyltriethoxysilane, vinyltris(β-methoxyethoxy)silane and γ-methacryloxypropyltrimethoxy-silane.

An unsaturated acid may be used in place of the organosilane compound. As the unsaturated acid, there can be used unsaturated carboxylic acids and their anhydrides, for example, acrylic acid, methacrylic acid, maleic acid, fumaric acid, citraconic acid, maleic anhydride and itaconic anhydride.

In the present invention, the amount of the organosilane compound or the unsaturated acid used is preferably 0.01–3 parts by weight, more preferably 0.3–1 part by weight based on 100 parts by weight of the crystalline ethylene-propylene block copolymer to be modified. When the amount is more than 3 parts by weight, the resulting composition gives poor appearance when molded. When the amount is less than 0.01 part by weight, the composition shows no improvement in properties such as Izod Impact Strength.

The organic peroxide used in the preparation of the modified polypropylene preferably has such a decomposition temperature for obtaining its one-minute half-life period, as is not lower than the melting point of the crystalline ethylene-propylene block copolymer used but not higher than 200° C. As such an organic peroxide, there can be mentioned, for example, t-butyl peroxybenzoate, t-butyl peroxymaleate, t-butyl peroxylaurate, cyclohexanone peroxide, 2,5-dimethyl-2,5-di(benzoylperoxy)hexane, t-butyl peroxyacetate, methyl ethyl ketone peroxide, dicumyl peroxide, 2,5-dimethyl-2,5-di(t-butylperoxy)hexane, t-butyl cumyl peroxide and di-t-butyl peroxide.

The amount of the organic peroxide used is preferably 0.05–1 part by weight based on 100 parts by weight of the crystalline ethylene-propylene block copolymer to be modified. When the amount is more than the limit, the resulting composition shows no improvement in properties such as Izod Impact Strength.

The preparation of the modified polypropylene by melt kneading the polypropylene and the organosilane compound or the unsaturated acid can be effected according to various known methods. In a simple and preferable method, a polypropylene is mixed with a modifier of an organosilane compound or an unsaturated acid and an organic peroxide; they are stirred using a Henschel mixer or the like; the mixture is melt kneaded using an extruder, preferably at 180°–250° C. for about 1–20 minutes and then extruded.

In the present composition, the component (a) is used in an amount of 45–75% by weight. When the amount is less than 45% by weight, the resulting composition has poor moldability. When the amount is more than 75% by weight, the composition has reduced balance in rigidity and impact resistance.

The ethylene-propylene copolymer used as the component (b) in the present invention is an ethylene-propylene rubber having an ethylene content of 30–80% by weight. The amount of the component (b) in the composition is 3–20% by weight, preferably 5–12% by weight. When the amount is less than 3% by weight, the resulting composition gives large warpage. When the amount is more than 20% by weight, the composition has insufficient rigidity.

The glass fiber used as the component (c) in the present invention is ordinarily glass chopped strands or glass rovings produced and marketed for resin reinforcement. A glass fiber having an average fiber diameter of 8–20 μm and an average fiber length of 2–15mm can be used. In view of the rigidity and impact strength of the resulting composition, there is preferred a glass fiber having an average fiber diameter of 8–16 μm and an average fiber length of 3–10 mm.

When the fiber diameter is less than 8 μm, the fiber breaks during kneading and the resulting composition has insufficient rigidity. When the fiber diameter is more than 20 μm, the glass fiber comes up to the surface of the composition. When the fiber length is less than 2 mm, the composition has insufficient rigidity. When the fiber length is more than 15 mm, the dispersibility of the composition is low and the appearance of the molded article produced from the composition is poor.

As the glass fiber, there can be preferably used a glass fiber subjected to a surface treatment with a coupling agent such as aminosilane compound, epoxysilane compound, vinylsilane compound, methacrylosilane compound or the like.

The average fiber length of the glass fiber in the final molded article is preferably 0.5 mm or more in view of the properties required for the molded article. To achieve this, it is preferable to produce a glass fiber-reinforced polypropylene composition by using an extruder having not only an ordinary feed opening but also a feed opening at the cylinder, feeding the components (a), (b) and (d) from the ordinary feed opening and the component (c) from the feed opening located at the cylinder and melt kneading these components.

The amount of the glass fiber in the composition of the present invention is 2–12% by weight, preferably 3–10% by weight. When the amount is less than 2% by weight, the resulting composition has insufficient rigidity. When the amount is more than 12% by weight, the composition gives larger warpage.

The mica used as the component (d) in the present invention has an average particle diameter of 40–160 μm. When there is used mica having an average particle diameter less than 40 μm, the resulting composition has insufficient rigidity and gives larger warpage. When the diameter is more than 160 μm, the composition has insufficient impact strength.

In order to prevent very large warpage, there are used, in combination, mica (A) having an average particle diameter of 40–90 μm, preferably 48–72 μm and an aspect ratio of 30–65, preferably 40–55 and mica (B) having an average particle diameter of 90–160 μm, preferably 110–150 μm and aspect ratio of 40–85, preferably 50–75, at a (B)/(A) weight ratio of 0.25–4, preferably 0.5–2. When the weight ratio is outside the range, the resulting composition gives very large warpage.

The type of mica used is not particularly restricted as long as it has an average particle diameter and an aspect ratio as mentioned above. The mica can be selected from biotite, muscovite, phlogopite, etc.

The mica used in the present invention may be subjected to a surface treatment with one of various surface treating agents.

The amount of mica used in the present composition is 15–35% by weight. When the amount is less than 15% by weight, the resulting composition has insufficient rigidity. When the amount is more than 35% by weight, the composition has insufficient impact resistance.

The composition of the present invention can further comprise various additives such as antioxidant, ultraviolet absorber, antistatic agent, heat stabilizer, nucleating agent, pigment and the like.

EXAMPLES

The present invention is described specifically below by way of Examples and Comparative Examples. However, the present invention is not restricted thereby.

The properties (test items) used for evaluating the reinforced polypropylene composition of the present invention were measured according to the following test methods.

1. Melt flow rate (MFR)
   Measured at 230° C. according to JIS K 7210.
2. Tensile yield strength (TYS)
   Measured at 23° C. according to JIS K 7113.
3. Flexural strength (FS)
   Measured at 23° C. according to JIS K 7203.
4. Flexural modulus (FM)
   Measured at 23° C. and 110° C. according to JIS K 7203.
5. Izod impact strength (notched)
   Measured at 23° C. according to JIS K 7110.
6. Heat deformation temperature (HDT)
   Measured under a load of 18.5 kg/cm2 according to JIS KS 7207.
7. Amount of warpage deformation
   As a test piece, there was used a rectangular plate of 2 mm (thickness)×360 mm (length)×160 mm (width) obtained by injection molding (in this injection molding, there was used a side gate provided at a position 75 mm inside from the end of the mold in the longitudinal direction). The test piece was allowed to stand for 48 hours under conditions of 23° C. and 50% relative humidity. The test piece was then placed on a given platen, and the distances (heights) from the platen to the most warping point in each of the two shorter side lines of the test piece were measured and their averaged value was taken as the warpage deformation amount of the test piece.
8. Aspect ratio
   Calculated from the average particle diameter and average thickness of mica.
   Average particle diameter of mica
   Obtained by measuring the particle size distribution of mica by Air Jet Sieve 200LS of ALPINE CO. using a JIS standard sieve, plotting the resulting data on a logarithmico-probability paper.
   Average thickness of mica
   Measured from the area of the monomolecular film of mica according to the Arakawa method of Kyoto University.
   Average aspect ratio
   Calculated using the following formula.

Average aspect ratio=Average particle diameter/average thickness

EXAMPLE 1

100 parts by weight of a crystalline ethylene-propylene block copolymer having a MFR of 3 g/10 min and an ethylene content of 7.5% by weight was mixed with 0.3 part by weight of itaconic anhydride, 0.2 part by weight of t-butyl peroxy.benzoate, 0.1 part by weight of 2,6-di-tert-butyl-4-methylphenol and 0.1 part by weight of pentaerythrityl tetrakis[3-(3,5-di-t-butyl-4-hydroxyphenyl)propionate]in a tumbler. The resulting mixture was melt kneaded in a single-screw extruder for 2 minutes at 200° C. to obtain a modified polypropylene graft-modified with itaconic anhydride, having a MFR of 16 g/10 min (this modified polypropylene is hereinafter abbreviated to modified PP-1).

In a tumbler were thoroughly mixed 60% by weight of the modified PP-1, 10% by weight of an ethylene-propylene copolymer having an ethylene content of 75% by weight and a Mooney viscosity $ML_{1+4}(100°$ C.) of 70 (this copolymer is hereinafter abbreviated to EPR-1) and 25% by weight of mica (A) (a product of Repco K.K.) having an average particle diameter of 48–72 μm and an aspect ratio of 40–55. The resulting mixture was fed .into a double-screw extruder having two feed openings (one is an ordinary feed opening and the other is a feed opening provided at the cylinder), from the ordinary feed opening. 5% by weight of a glass fiber (chopped strands) (a product of NITTO BOSEKI CO., LTD., hereinafter abbreviated to GF-1) having a diameter of 10 μm and a length of 6mm and having been subjected to a surface treatment with aminosilane was fed into the extruder from the feed opening provided at the cylinder, with metering. These components were melt kneaded and extruded at 240–260° C. to obtain pellets. The pellets were subjected to injection molding to prepare test pieces. The test pieces were used for evaluation of various properties. The results are shown in Table 1.

EXAMPLES 2 and 3

The procedure of Example 1 was repeated except that in Example 2, the amounts of the modified PP-1, the EPR-1 and the mica (A) were changed to 67% by weight, 8% by weight and 20% by weight, respectively, and in Example 3, the amounts of the modified PP-1 and the mica (A) were changed to 55% by weight and 30% by weight, respectively. The results are shown in Table 1.

EXAMPLES 4 and 5

The procedure of Example 1 was repeated except that in Example 4, the amounts of the GF-1 and the mica (A) were changed to 10% by weight and 20% by weight, respectively, and in Example 5, the amounts of the modified PP-1 and the GF-1 were changed to 55% by weight and 10% by weight, respectively. The results are shown in Table 1.

EXAMPLES 6 and 7

The procedure of Example 1 was repeated except that in Example 6, the amounts of the modified PP-1 and the EPR-1 were changed to 65% by weight a nd 5% by weight, respectively, and in Example 7, the amounts of the modified PP-1 and the EPR-1 were changed to 58% by weight and 12% by weight, respectively. The results are shown in Table 1.

EXAMPLES 8 and 9

The procedure of Example 1 was repeated except that in Example 8, the GF-1 was replaced by the same amount of a glass fiber (untreated) (a product of NITTO BOSEKI CO., LTD., hereinafter abbreviated to GF-3) having a diameter of 11 μm and a length of 6 mm and in Example 9, the EPR-1 was replaced by the same amount of an ethylene-propylene copolymer (hereinafter abbreviated to EPR-2) having an ethylene content of 66% by weight and a Mooney viscosity $ML_{1+4}(100°$ C.) of 68. The results are shown in Table 1.

COMPARATIVE EXAMPLE 1

The procedure of Example 1 was repeated except that the amount of the GF-1 was changed to 30% by weight and no mica (A) was used. The results are shown in Table 1.

COMPARATIVE EXAMPLE 2

The procedure of Example 1 was repeated except that the amounts of the modified PP-1 and the mica (A) were changed to 57% by weight and 33% by weight, respectively, and no GF-1 was used. The results are shown in Table 1.

COMPARATIVE EXAMPLES 3 and 4

The procedure of Example 1 was repeated except that in Comparative Example 3, the amount of the modified PP-1 was changed to 70% by weight and no EPR-1 was used and in Comparative Example 4, the amounts of the modified PP-1, the GF-1 and the mica (A) were changed to 70% by weight, 10% by weight and 20% by weight, respectively, and no EPR-1 was used. The results are shown in Table 1.

COMPARATIVE EXAMPLES 5 and 6

The procedure of Example 1 was repeated except that in Comparative Example 5, the amounts of the modified PP-1, the EPR-1, the GF-1 and mica (A) were changed to 45% by weight, 25% by weight, 1 0% by weight and 20% by weight, respectively, and in Comparative Example 6, the amounts of the modified PP-1 and the mica (A) were changed to 45% by weight and 40% by weight, respectively. The results are shown in Table 1.

TABLE 1

| | Example | | | | | | | | |
|---|---|---|---|---|---|---|---|---|---|
| | 1 | 2 | 3 | 4 | 5 | 6 | 7 | 8 | 9 |
| Composition (% by weight) | | | | | | | | | |
| Modified PP-1 | 67 | 67 | 55 | 60 | 55 | 65 | 58 | 60 | 60 |
| Modified PP-2 | — | — | — | — | — | — | — | — | — |
| Modified PP-3 | — | — | — | — | — | — | — | — | — |
| Modified PP-4 | — | — | — | — | — | — | — | — | — |
| Silane-Modified PP-1 | — | — | — | — | — | — | — | — | — |
| Silane-Modified PP-2 | — | — | — | — | — | — | — | — | — |
| EPR-1 | 10 | 8 | 10 | 10 | 10 | 5 | 12 | 10 | — |
| EPR-2 | — | — | — | — | — | — | — | — | 10 |
| GF-1 | 5 | 5 | 5 | 10 | 10 | 5 | 5 | — | 5 |
| GF-2 | — | — | — | — | — | — | — | — | — |
| GF-3(untreated) | — | — | — | — | — | — | — | 5 | — |
| Mica(A) | 25 | 20 | 30 | 20 | 25 | 25 | 25 | 25 | 25 |
| Mica(B) | — | — | — | — | — | — | — | — | — |
| Mica(C) | — | — | — | — | — | — | — | — | — |
| Properties | | | | | | | | | |
| MFR (g/10 min) | 5.8 | 6.6 | 4.5 | 4.2 | 3.2 | 8.4 | 3.4 | 6.4 | 5.9 |
| TYS (kg/cm$^2$) | 375 | 369 | 387 | 470 | 481 | 416 | 339 | 345 | 362 |
| FS (kg/cm$^2$) | 507 | 508 | 548 | 634 | 661 | 593 | 450 | 447 | 481 |
| FM | | | | | | | | | |
| 23° C. (kg/cm$^2$) | 33300 | 31000 | 39400 | 35600 | 42200 | 36700 | 30700 | 30100 | 31800 |
| 110° C. (kg/cm$^2$) | — | — | — | — | — | — | — | — | — |
| Izod (kg · cm/cm) | 9.8 | 10.8 | 9.5 | 13.3 | 12.8 | 8.1 | 12.4 | 5.3 | 10.5 |
| HDT (°C.) | 114 | 112 | 117 | 128 | 138 | 121 | 104 | 107 | 108 |
| Warpage deformation amount (m/mm) | 0.80 | 2.40 | 1.00 | 2.90 | 1.10 | 1.30 | 1.80 | 0.63 | 0.92 |

| | Comparative Example | | | | | |
|---|---|---|---|---|---|---|
| | 1 | 2 | 3 | 4 | 5 | 6 |
| Composition (% by weight) | | | | | | |
| Modified PP-1 | 60 | 57 | 70 | 70 | 45 | |
| Modified PP-2 | — | — | — | — | — | |
| Modified PP-3 | — | — | — | — | — | |
| Modified PP-4 | — | — | — | — | — | |
| Silane-Modified PP-1 | — | — | — | — | — | |
| Silane-Modified PP-2 | — | — | — | — | — | |
| EPR-1 | 10 | 10 | — | — | 25 | |
| EPR-2 | — | — | — | — | — | |
| GF-1 | 30 | — | 5 | 10 | 10 | |
| GF-2 | — | — | — | — | — | |
| GF-3(untreated) | — | — | — | — | — | |
| Mica(A) | — | 33 | 25 | 20 | 20 | |
| Mica(B) | — | — | — | — | — | |
| Mica(C) | — | — | — | — | — | |
| Properties | | | | | | |
| MFR (g/10 min) | 6.2 | 8.8 | 11.2 | 8.4 | 1.2 | |
| TYS (kg/cm$^2$) | 697 | 263 | 455 | 582 | 302 | |
| FS (kg/cm$^2$) | 911 | 397 | 660 | 806 | 350 | |
| FM | | | | | | |
| 23° C. (kg/cm$^2$) | 46200 | 29000 | 40100 | 43400 | 24600 | |
| 110° C. (kg/cm$^2$) | — | — | — | — | — | |
| Izod (kg · cm/cm) | 20.6 | 5.8 | 6.5 | 9.2 | 19.2 | |
| HDT (°C.) | 140 | 84 | 126 | 138 | 100 | |
| Warpage deformation amount (m/mm) | 15.10 | 0.70 | 3.20 | 7.50 | 2.20 | |

EXAMPLE 10

The procedure of Example 1 was repeated except that the amount of the modified PP-1 was changed to 30% by weight, 30% by weight of a crystalline ethylene-propylene block copolymer having a MFR of 15 g/10 min and an ethylene content of 7.5% by weight (hereinafter this copolymer is abbreviated to unmodified PP) was added newly, and the GF-1 was replaced by the same amount (5% by weight) of a glass fiber of chopped strands (a product of Fuji Fiber Glass K.K., hereinafter abbreviated to GF-2) having a diameter of 11 μm and a length of 6 mm, which had been subjected to a surface treatment with aminosilane. The results are shown in Table 2.

EXAMPLE 11

The procedure of Example 10 was repeated except that the mica (A) was replaced by the same amount (25% by weight) of mica (B) (a product of Repco K.K.) having an average particle diameter of 110–150 μm and an aspect ratio of 50–70. The results are shown in Table 2.

COMPARATIVE EXAMPLE 7

The procedure of Example 10 was repeated except that the mica (A) was replaced by the same amount (25% by weight) of mica (C) (a product of KURARAY CO., LTD.) having an average particle diameter of 16 μm and an average aspect ratio of 35. The results are shown in Table 2.

EXAMPLE 12

The procedure of Example 10 was repeated except that the amount of the mica (A) was changed to 12.5% by weight and there was newly used 12.5% by weight of mica (B). The results are shown in Table 2.

EXAMPLES 13 and 14

The procedure of Example 10 was repeated except that in Example 13, the amounts of the GF-2 and the mica (A) were changed to 3% by weight and 27% by weight, respectively, and in Example 14, the amounts of the GF-2 and the mica (A) were changed to 3% by weight and 13.5% by weight, respectively, and there was newly used 13.5% by weight of mica (B). The results are shown in Table 2.

COMPARATIVE EXAMPLE 8

The procedure of Example 12 was repeated except that the components as shown in Table 2 were used in the amounts as shown in Table 2. The results are shown in Table 2.

EXAMPLE 15 and 16

The procedure of Example 14 was repeated except that in Example 15, the amounts of the modified PP-1 and the unmodified PP were changed to 20% by weight and 40% by weight, respectively, and the GF-2 was changed to the same amount (3% by weight) of the GF-1 and in Example 16, the amounts of the mica (A) and the mica (B) were changed to 7% by weight and 20% by weight, respectively. The results are shown in Table 2.

EXAMPLES 17, 18 and 19

The procedure of Example 1 was repeated except that in Example 17, the modified PP-1 was replaced by the same amount (60% by weight) of a modified polypropylene (hereinafter abbreviated to modified PP-2) having a MFR of 9 g/10 min, obtained by graft-modifying a crystalline ethylene-propylene block copolymer having a MFR of 1 g/10 min and an ethylene content of 5.5% by weight with itaconic anhydride in the same manner as in Example 1, and in Example 18, the modified PP-1 was replaced by the same amount (60% by weight) of a modified polypropylene (hereinafter abbreviated to modified PP-3) having a MFR of 9 g/10 min, obtained by graft-modifying a crystalline ethylene-propylene block copolymer having a MFR of 1 g/10 min and an ethylene content of 10% by weight with itaconic anhydride in the same manner as in Example 1, and in Example 19, the modified PP-1 was replaced by the same amount (60% by weight) of a modified polypropylene (hereinafter abbreviated to modified PP-4) having a MFR of 9 g/10 min, obtained by graft-modifying a crystalline ethylene-propylene block copolymer having a MFR of 1 g/10 min and an ethylene content of 7.5% by weight with itaconic anhydride (the amount used was 0.7% by weight) in the same manner as in Example 1. The results are shown in Table 2.

EXAMPLE 20

The procedure of Example 1 was repeated except that the itaconic anhydride was replaced by 0.3% by weight of γ-methacryloxypropyltrimethoxysilane, to obtain a silane-modified polypropylene (hereinafter abbreviated to silane-modified PP-1) having a MFR of 10 g/10 min.

60% by weight of this silane-modified PP-1, 10% by weight of the EPR-1, 25% by weight of the mica (A) and 5% by weight of the GF-1 were subjected to the same treatment as in Example 1 to obtain test pieces of a reinforced polypropylene composition. The test pieces were evaluated for various properties. The results are shown in Table 2.

EXAMPLE 21

The procedure of Example 20 was repeated except that the silane-modified PP-1 was replaced by a silane-modified polypropylene (hereinafter referred to as silane-modified PP-2) having a MFR of 7 g/10 min, obtained in the same manner as in Example 19 except that the itaconic anhydride was replaced by 0.7% by weight of γ-methacryloxypropylmethoxysilane. The results are shown in Table 2.

TABLE 2

| | Example | | | | | | |
|---|---|---|---|---|---|---|---|
| | 10 | 11 | 12 | 13 | 14 | 15 | 16 |
| Composition (% by weight) | | | | | | | |
| Modified PP-1 | 30 | 30 | 30 | 30 | 30 | 20 | 30 |
| Modified PP-2 | — | — | — | — | — | — | — |
| Modified PP-3 | — | — | — | — | — | — | — |
| Modified PP-4 | — | — | — | — | — | — | — |
| Unmodified PP | 30 | 30 | 30 | 30 | 30 | 40 | 30 |
| Silane-Modified PP-1 | — | — | — | — | — | — | — |

TABLE 2-continued

| | | | | | | | |
|---|---|---|---|---|---|---|---|
| Silane-Modified PP-2 | — | — | — | — | — | — | — |
| EPR-1 | 10 | 10 | 10 | 10 | 10 | 10 | 10 |
| EPR-2 | — | — | — | — | — | — | — |
| GF-1 | — | — | — | — | — | 3 | — |
| GF-2 | 5 | 5 | 5 | 3 | 3 | — | 3 |
| GF-3(untreated) | — | — | — | — | — | — | — |
| Mica(A) | 25 | — | 12.5 | 27 | 13.5 | 13.5 | 7 |
| Mica(B) | — | 25 | 12.5 | — | 13.5 | 13.5 | 20 |
| Mica(C) | — | — | — | — | — | — | — |
| Properties | | | | | | | |
| MFR (g/10 min) | 3.8 | 5.2 | 4.7 | 5.1 | 4.2 | 3.5 | 3.9 |
| TYS (kg/cm$^2$) | 390 | 360 | 372 | 346 | 328 | 325 | 320 |
| FS (kg/cm$^2$) | 555 | 514 | 537 | 503 | 467 | 455 | 455 |
| FM | | | | | | | |
| 23° C. (kg/cm$^2$) | 33600 | 32900 | 36300 | 34200 | 32500 | 31200 | 31000 |
| 110° C. (kg/cm$^2$) | 10900 | 10000 | 11000 | 9800 | 8900 | 8600 | 8500 |
| Izod (kg · cm/cm) | 9.4 | 8.9 | 8.7 | 7.9 | 8.1 | 7.2 | 8.0 |
| HDT (°C.) | 116 | 112 | 113 | 107 | 110 | 102 | 112 |
| Warpage deformation amount (m/mm) | 0.92 | 0.38 | 0.30 | 0.67 | 0.12 | 0.21 | 0.11 |

| | Example | | | | | Comparative Example | |
|---|---|---|---|---|---|---|---|
| | 17 | 18 | 19 | 20 | 21 | 7 | 8 |
| Composition (% by weight) | | | | | | | |
| Modified PP-1 | — | — | — | — | — | 30 | 10 |
| Modified PP-2 | 60 | — | — | — | — | — | — |
| Modified PP-3 | — | 60 | — | — | — | — | — |
| Modified PP-4 | — | — | 60 | — | — | — | — |
| Unmodified PP | — | — | — | — | — | 30 | 50 |
| Silane-Modified PP-1 | — | — | — | 60 | — | — | — |
| Silane-Modified PP-2 | — | — | — | — | 60 | — | — |
| EPR-1 | 10 | 10 | 10 | 10 | 10 | 10 | 10 |
| EPR-2 | — | — | — | — | — | — | — |
| GF-1 | 5 | 5 | 5 | 5 | 5 | — | — |
| GF-2 | — | — | — | — | — | 5 | 3 |
| GF-3(untreated) | — | — | — | — | — | — | — |
| Mica(A) | 25 | 25 | 25 | 25 | 25 | — | 13.5 |
| Mica(B) | — | — | — | — | — | — | 13.5 |
| Mica(C) | — | — | — | — | — | 25 | — |
| Properties | | | | | | | |
| MFR (g/10 min) | 5.7 | 5.6 | 5.6 | 4.6 | 4.3 | 2.8 | 2.9 |
| TYS (kg/cm$^2$) | 377 | 370 | 373 | 379 | 377 | 382 | 315 |
| FS (kg/cm$^2$) | 510 | 498 | 512 | 515 | 513 | 524 | 439 |
| FM | | | | | | | |
| 23° C. (kg/cm$^2$) | 34000 | 32900 | 33700 | 34800 | 34500 | 26500 | 29200 |
| 110° C. (kg/cm$^2$) | — | — | — | — | — | 8500 | 7900 |
| Izod (kg · cm/cm) | 9.0 | 10.2 | 9.8 | 9.7 | 9.8 | 8.9 | 4.0 |
| HDT (°C.) | 116 | 111 | 115 | 118 | 118 | 107 | 82 |
| Warpage deformation amount (m/mm) | 0.85 | 0.72 | 0.81 | 0.90 | 0.88 | 6.70 | 0.26 |

As is clear from the above Examples, the compositions of the present invention are well balanced in tensile strength, flexural strength, flexural modulus, Izod impact strength and heat resistance and give very low deformation (the warpage deformation amounts are 3 mm or less and, in most cases, 2 mm or less).

In contrast, the composition of Comparative Example 1 containing no mica [no component (d)] gives a warpage deformation amount of 1 5.1 mm; the composition of Comparative Example 6 wherein the mica content is outside the range specified by the present invention, also gives a large warpage deformation amount; the composition of Comparative Example 2 containing no glass fiber [no component (c)] gives low warpage deformation but is poor in tensile strength, flexural modulus, heat resistance, etc.; the composition of Comparative Example 8 containing only 10% by weight of a modified polypropylene gives low warpage deformation but is poor in Izod impact strength, heat resistance, etc.; thus, in the compositions of Comparative Examples, the balance of properties is poor or the warpage deformation of molded article is large.

What is claimed is:

1. A reinforced polypropylene composition comprising:
   (a) 45-75% by weight of (1) a modified copolymer obtained by modifying a first ethylene-propylene block copolymer, which is crystalline and has an ethylene content of 2-30% by weight, by reaction of 100 parts by weight of said first copolymer with 0.01-3 parts by weight of an unsaturated acid or a silane having an ethylenically unsaturated bond in the presence of 0.05-1 part by weight of an organic peroxide, or (2) a mixture of said modified copoloymer and said first copolymer,
   (b) 3-20% by weight of a second ethylene-propylene copolymer rubber having an ethylene content of 30-80% by weight;
   (c) 2-12% by weight glass fiber; and pl (d) 15-35% by weight of a mica admixture of mica (A) having an average particle diameter of 40-90 μm and an aspect ratio of 30-65 and mica (B) having an average particle diameter of 90-160 μm and an aspect ratio of 40–85, the weight ratio of (B)/(A) being 0.25–4.

2. A reinforced polypropylene composition according to claim 11, wherein the component (a) is a mixture of said modified copolymer and said first copolymer and the amount of said modified copolymer is at least 20% by weight of the composition.

3. A reinforced polypropylene composition according to claim 1, wherein said glass fiber has an average diameter of 8–20 μm and an average length of 2–15 mm.

4. A reinforced polypropylene composition according to claim 11, wherein said glass fiber has been surface treated with a coupling agent.

5. A reinforced polypropylene composition according to claim 1, wherein said glass fiber is 3–10 weight % of said composition.

6. A reinforced polypropylene composition in accordance with claim 1, wherein said first copolymer contains 3–15% by weight ethylene.

7. A reinforced polypropylene composition in accordance with claim 1 or 6 wherein said mica (A) has an average particle diameter of 48–72 μm and an aspect ratio of 40–55 and said mica (B) has an average particle diameter of 110–150 μm and an aspect ratio of 50–75.

8. A reinforced polypropylene composition in accordance with cliam 2 wherein the weight ratio of (B)/(A) is 0.5–2.

* * * * *